United States Patent

Belyea

[11] Patent Number: 5,878,772
[45] Date of Patent: Mar. 9, 1999

[54] TANK TRUCK FUEL DELIVERY SYSTEM HAVING A SELECTIVE DYE INJECTION SYSTEM

[75] Inventor: Stephen A. Belyea, Hampton, Canada

[73] Assignee: Irving Oil Limited, Canada

[21] Appl. No.: 615,818

[22] Filed: Mar. 14, 1996

[51] Int. Cl.$^6$ .................................................. G05D 11/13
[52] U.S. Cl. ....................................................... 137/101.21
[58] Field of Search ........................... 137/101.21, 101.19

[56] References Cited

U.S. PATENT DOCUMENTS

| | | | |
|---|---|---|---|
| 3,036,585 | 5/1962 | Shawhan | 137/101.21 X |
| 3,225,962 | 12/1965 | Leobeck . | |
| 3,283,957 | 11/1966 | Henderson | 137/101.21 X |
| 3,964,294 | 6/1976 | Shair et al. . | |
| 4,005,803 | 2/1977 | Kent . | |
| 4,007,755 | 2/1977 | Lerner et al. | 137/101.21 |
| 4,007,876 | 2/1977 | Stevenson . | |
| 4,276,997 | 7/1981 | Ambler . | |
| 4,324,294 | 4/1982 | McLoughlin et al. | 137/101.21 X |
| 4,337,786 | 7/1982 | Myers et al. | 137/101.21 X |
| 4,886,367 | 12/1989 | Bragg et al. . | |
| 5,222,027 | 6/1993 | Williams et al. . | |
| 5,494,112 | 2/1996 | Arvidson et al. | 137/101.21 |

FOREIGN PATENT DOCUMENTS 2088565   2/1993   Canada .

*Primary Examiner*—Stephen M. Hepperle
*Attorney, Agent, or Firm*—Gary M. Nath; Harold L. Novick; Nath & Associates

[57] ABSTRACT

A fuel delivery system for use in combination with a fuel delivery truck, said system having a dye additive injector for selectively adding a predetermined amount of dye into a main fuel delivery line, comprising: a dye additive storage tank, having an inlet and outlet, adapted to receive a dye additive; a dye flow line for passage of said dye additive out of the storage tank and into the fuel delivery line; and a means for selectively initiating and terminating the flow of said dye additive out of the storage tank, through the dye flow line and into the fuel delivery line.

9 Claims, 1 Drawing Sheet

TANK TRUCK FUEL DELIVERY SYSTEM HAVING A SELECTIVE DYE INJECTION SYSTEM

The invention herein relates to a tank truck fuel delivery system having a dye injector to selectively switch between the delivery of dyed and undyed liquid fuel.

BACKGROUND OF THE INVENTION

Liquid fuels, and in particular diesel fuels, are colour coded for governmental tax purposes. For example, the amount of tax charged by governmental bodies on diesel fuel destined for agricultural use is different than diesel fuel destined for use by transport trucks. The tax on fuel is collectible by the fuel supplier, usually the petroleum company, and in order for the governmental bodies to be able to monitor that the correct taxes have been paid by the user the fuel is colour coded.

The fuel dye is usually provided to petroleum companies by the governmental body responsible for levying taxes on fuel. Usually, a volume of a known concentration of dye is provided to the petroleum company to be mixed with undyed fuel in a particular ratio to produce the dyed fuel. Since the governmental body specifies the final concentration of dye in the fuel, they can collect taxes based upon the amount of concentrate provided to the petroleum company as a measure of the amount of dyed fuel sold. Governmental authorities routinely check on the concentration of dye in dyed fuels to ensure that it meets with their specifications and thus provides an accurate measure of dyed fuels sold. Precise calibration of the mixing of fuel and dye is therefore extremely important. The amount of undyed fuel sold is calculated for tax purposes by taking the measurement of total fuel sold and subtracting from it the amount of dyed fuel that the known volume of dye provided to the supplier would have made.

Presently, it is necessary to maintain separate storage tanks at bulk terminals for dyed and undyed fuel. It is also necessary for trucks delivering the fuel to the end user to either carry only one variety of fuel at a time or to have multiple tanks on the truck. This creates a number of logistical problems as well as requiring increased storage capacity and a relatively large fleet of delivery trucks to ensure sufficient delivery capacity. Furthermore, when a tank-truck has been used to deliver one particular fuel, and it is needed to deliver another, the tank, hose and pump must be completely flushed and this adds to both time and overhead in the delivery process. A need therefore exists for a delivery system which is capable of carrying unmarked (i.e. undyed) fuel and at the point of delivery to the user providing either dyed or undyed fuel. Furthermore, because of the taxes levied on the fuel is based upon the amount of dye provided to the fuel supplier, extremely precise measurement of the amount of dye added to the fuel is required. Additionally, for security purposes, the driver delivering the fuel should not be able to access the dye injection system. He should only be able to select either dyed or undyed fuel.

A variety of additive injection systems are presently known. For example, U.S. Pat. No. 3,225,962 discloses a method specifically directed to adding odorants to liquid propane gas at bulk facilities when using automatic dispensing to a tank truck. The additive flow is metered and automatic shut-off of the main flow is provided where additive flow is too low. The additive is maintained under pressure and driven by a compressed gas. This system is of unknown accuracy and does not solve the problem of requirement of multiple products at the point of delivery.

U.S. Pat. No. 3,964,294 discloses a system for adding active tags to petroleum products for identification of the source of the product should they be involved in a spill. The system does not teach or suggest a constant metered addition of an additive into a stream of fuel, instead a bulk crudely measured amount of tracer is added.

U.S. Pat. No. 4,005,803 discloses a sprayer apparatus in which chemical concentrates are added to water for spraying behind a moving piece of farm equipment. Water pressure range determines whether the injection is terminated. A constant water flow rate is provided with the amount of injection, which is not metered, but which varies with the ground speed of the implement.

U.S. Pat. No. 4,276,997 discloses a system which injects anti icing additives into aircraft fuel tanks. It utilizes a series of discreet additive injections each time a measured amount of fuel is delivered. The calibration of this system is controlled by the operator and the additive is added prior to the delivery hose.

U.S. Pat. No. 5,222,027 discloses a system for remote control and monitoring of additive injection at a fuel terminal. It is a stationary system in which the concentrations are set by the users.

OBJECTS OF THE INVENTION

It is an object of the present invention to provide a fuel delivery system having a dye additive injector which is capable of selectively providing dyed or undyed fuel at the point of delivery.

It is a further object of the present invention to provide a fuel delivery system having a dye additive injector which is capable of selectively providing dyed or undyed fuel at the point of delivery which is tamper proof and which can only be accessed by authorized individuals.

It is a still further object of the invention to provide a fuel delivery system having a dye additive injector which is capable of selectively providing dyed or undyed fuel at the point of delivery and which is such that when the supply of dye to create dyed fuel is exhausted, the delivery system automatically becomes inoperative until the supply of dye is recharged.

SUMMARY OF THE INVENTION

Accordingly, the invention herein comprises a fuel delivery system for use in combination with a fuel delivery truck, said system having a dye additive injector for selectively adding a predetermined amount of dye into a main fuel delivery line, said system comprising: a dye additive storage tank, having an inlet and outlet, adapted to receive a dye additive; a dye flow line for passage of said dye additive out of the storage tank and into the fuel delivery line; and a means for selectively initiating and terminating the flow of said dye additive out of the storage tank, through the dye flow line and into the fuel delivery line.

The invention further comprises a fuel delivery system for use in combination with a fuel delivery truck, said system having a dye additive injector for selectively adding a pre-determined precise amount of dye into the fuel upon delivery, comprising: a fuel delivery hose having a delivery nozzle; a dye storage tank, having an inlet and outlet, adapted to receive a dye additive; a dye flow line for passage of said dye out of the storage tank, through said delivery hose, and into the fuel at said nozzle; and a means for selectively initiating and terminating the flow of said dye additive out of the storage tank, through the dye flow line and into the fuel at the delivery nozzle.

BRIEF DESCRIPTION OF THE DRAWING

These and other advantages of the invention will become apparent upon reading the following detailed description and upon referring to the drawing in which.

Figure 1:
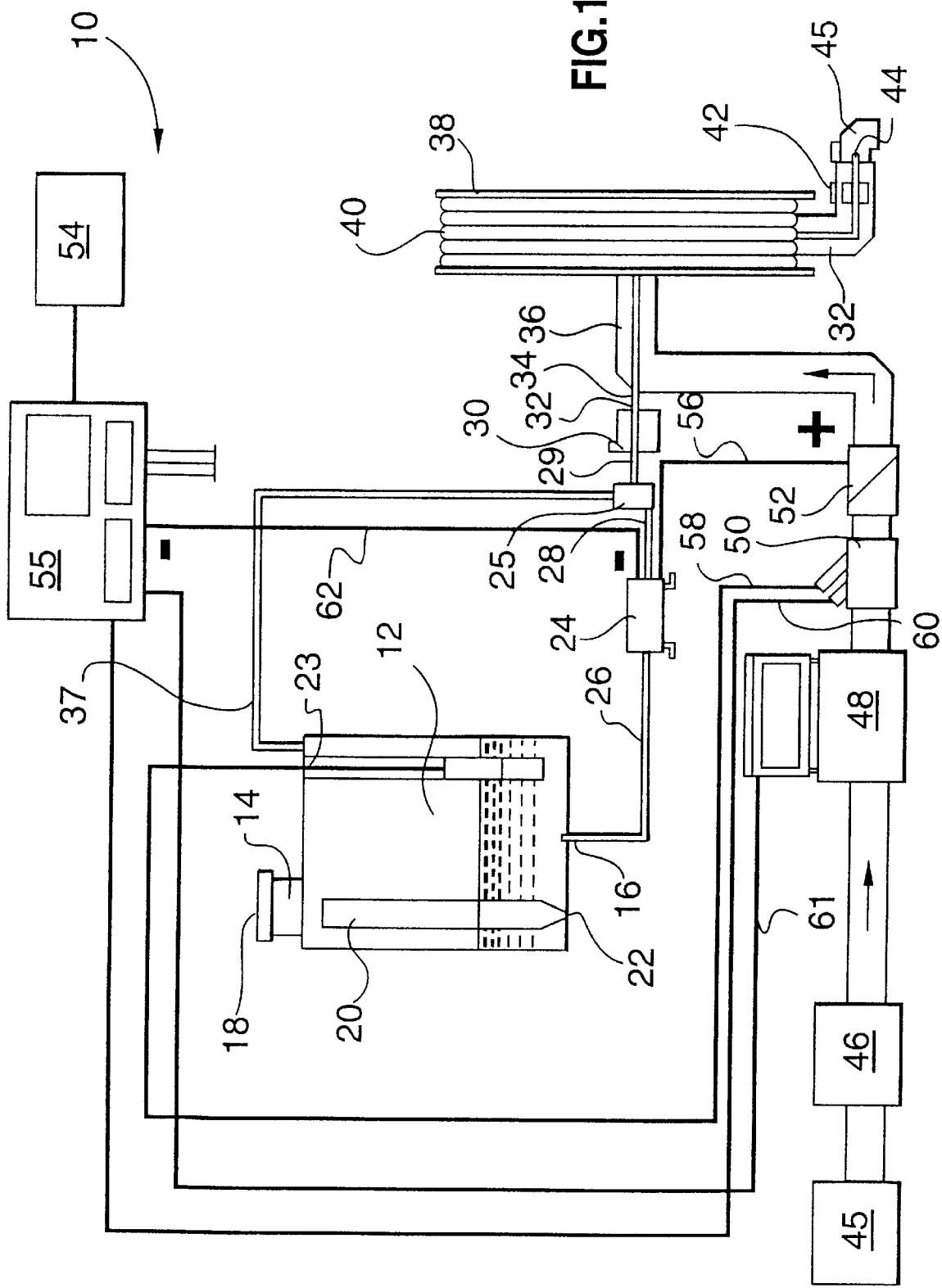
FIG. 1 is a schematic representation of the system of the present invention.

While the invention will be described in conjunction with an illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Referring to FIG. 1, the on-board fuel truck additive injector system 10 consists of a dye additive storage tank 12 which is provided with an inlet 14 and an outlet 16. The tank 12 has a locking filler cap 18, to secure the inlet 14, as well as a level gauge 20, preferably a sight glass, a test drain 22 and a low level float sensor 23. The filler cap 18 may also be provided with a ring for affixing a breakable security seal. The outlet 16 of tank 12 is connected to a dye injection pump 24 by line 26. The injection pump is connected by a line 28 to a pressure relief valve 25 and then by line 29 to calibration metering block 30. The metering block 30 is in turn connected to an additive dye flow line 32 which is connected via joint 34 to fuel delivery line 36. Pressure relief valve 25 has a return flow line 37 which is connected to tank 12. Delivery line 36 is connected to a hose reel 38 carrying a fuel delivery hose 40. The dye flow line 32 runs internally through the fuel delivery line 36, to its fuel delivery hose 40 and to a check valve 42 and injector spray nozzle 44 mounted within the fuel delivery nozzle 45. An optional sight glass can be added to nozzle 45 to check the colour of fuel being delivered.

The fuel delivery line 36 carries fuel received from the tank truck storage tank 45 which has been pumped by a cargo pump 46. The fuel delivery line has a flow meter 48, electronic control valve 50 and a flow switch 52.

The dye injector pump 24 is electronically connected to flow switch 52 by a cable 56 and a control device 54 by line 62. The electronic control valve 50 is electronically connected to the low level sensor 23 by cable 58 and the control device 54 by cable 60. The truck meter 48 is electronically connected to the billing computer 55 by cable 62.

Tank trucks presently carry on-board billing and metering computers 55 to simplify the delivery and billing of fuel to customers. One such device is a MID-COM 8000 (TM) device. The billing computer 55 activates the electronic control valve 50 on a tank truck when a ticket is inserted into the computer. Once delivery of fuel is completed, the billing computer prints on the ticket the date and time of delivery, the volume of the fuel delivery and the price for that volume of fuel. The device can be suitably modified by adding additional software control in the form of the control device 54 to select between dyed or undyed fuel by controlling the operation of the dye injector pump 24.

The dye provided by the governmental body is generally too concentrated to be safely handled in its undiluted form and, accordingly, it must be diluted to a solution of known concentration to be mixed with the fuel to be delivered by tank truck. The calibration metering block 30 allows authorized personnel at the service facility to adjust the rate of flow of dye in line 28 to the flow of fuel line 36. In this way the system ensures the correct delivery volume of dye in reference to volume of fuel to create a dyed product in compliance with government concentration standards. The calibration of the metering block is set and sealed at the service facility prior to the truck being put into service. It is also possible to inspect and test the concentration of the dye stored in the storage tank 12 by withdrawing a small sample through the test drain 22. The concentrations of samples withdrawn from the test drain 22 and obtained after mixing at the nozzle 44 are measured by known spectrophotometric techniques which measure the absorbency factor of the liquid (i.e. the amount of light able to pass through it).

Therefore, prior to making a series of deliveries, the main storage tank of the tank truck is first filled with a particular type of fuel to be delivered either in dyed or undyed form. The dye reservoir is next inspected by authorized personnel at the service facility of the bulk terminal to ensure that it contains sufficient dye solution for the tank truck to complete its assigned delivery round. If the dye tank 12 requires filling, the locking cap 18 is removed by the authorized personnel and dye solution added. If calibration of the metering block is required, this is also done at this time by authorized employees at the service facility.

In operation, the operator of the delivery truck, prior to making a delivery at a particular location, enters a specific code into the billing computer 55 depending upon whether dyed on undyed fuel is to be delivered. This entry is made as part of the routine entry of required information into the billing computer to initiate fuel flow. A delivery cannot be made unless a code is entered since the control device 54 of the billing computer will not authorize the computer to provide the electronic control valve 50 with power unless a specific code is entered. If dyed fuel is chosen, the cab computer 55 signals the control device 54 and it activates a negative ground needed to power to the dye pump 24 along cable 62. When the nozzle 44 is opened to initiate flow of fuel, the idling cargo pump 46 pushes fuel into line 36 and the flow in the line trips flow switch 52 which, in turn, activates a positive connection to the dye pump 24 along cable 56 and then signals the delivery truck's engine which drives pump 46 to increase its revolutions, bringing the flow in line 36, and out of nozzle 44, to a maximum. This causes the withdrawal of dye solution from the reservoir 12 and line 28 to become pressurized with dye solution such that the dye is dispensed into the fuel at the nozzle 45, through injector spray nozzle 44, at the same instant the fuel reaches nozzle 44. During delivery of fuel, the flow out of nozzle 44 continues to be mixed with dye flowing from the reservoir 12 through to the check valve 42 and spray nozzle 44 where it contacts and mixes with the fuel. Once delivery is complete, the flow switch 52 closes, eliminating power to the dye pump 24 and activating a pressure release valve 25, which opens allowing dye line pressure to escape into dye storage tank 12 allowing check valve 42 to close both to prevent the back flushing of any fuel into the line 36 and also to prevent any dye solution from escaping through the nozzle 44. In the cab, a receipt is printed by the billing computer for the customer to whom the delivery was made. The receipt contains all of the usual information such as date and time of delivery, customer name, volume of fuel delivered, and, in addition, the product code for the type of fuel product (dyed or undyed). If undyed fuel is chosen for delivery, the code which is entered into the billing computer by the operator bypasses the control circuit such that the dye pump 24 is not activated. There being no pressure in the line 28, when flow out of nozzle 44 is activated the check valve 42 remains closed and undyed fuel is dispensed.

In this way, alternate deliveries of dyed or undyed fuel can be made from the same tank truck. Additionally, the fact that mixing of the dye occurs at delivery nozzle, eliminating any problems of line flushing between deliveries.

The dye injection system has a number of security features which ensure that only delivery of the fuel selected at the billing computer can be made. If the dye tank 12 runs out of dye, a low level float sensor 23 signals the electronic control valve along cable 50 and this automatically terminates the flow out of nozzle 44. The tank truck must then return to the service facility where authorized personnel can gain access to the dye tank 23 and re-fill it with dye solution. The dye tank 23 has a locking cap to which only authorized service personnel have the key. The cap may also be sealed with a plastic security seal or tamper indicator. The control cables to the dye pump are tamper proof such that any attempt to disconnect them, and thus the power to the dye pump, will cause a complete loss of power to the entire system and in particular the electronic control valve 50.

Thus, it is apparent that there has been provided in accordance with the invention a tank truck fuel delivery system having selective dye injection system that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A fuel delivery system for use in combination with a fuel delivery truck, said system having a dye additive injector for selectively adding a precise predetermined amount of dye into a main fuel delivery line so that the delivery system can selectively deliver either dyed or undyed fuel, comprising:

a dye additive storage tank, having an inlet and an outlet, adapted to received a dye additive;

a dye additive flow line for passage of said dye additive out of the storage tank and into the fuel delivery line;

a pump means for selectively initiating and terminating the flow of said dye additive out of the storage tank, through the dye additive flow line and into the main fuel delivery line;

a sealed metering block to adjust the volume of flow in the dye additive flow line to provide a dyed fuel of uniform concentration; and a billing computer to control the operation of the pump means by only activating the pump means to initiate the flow of dye into the main fuel delivery line when, for a particular delivery, a billing code for dyed fuel is entered into the billing computer and to maintain the pump means in operation during the particular delivery of dyed fuel.

2. A fuel delivery system according to claim 1 further comprising an electronic control valve on the main fuel delivery line and a tamper proof means, wherein if the power supply to the pump means for selectively initiating and terminating the flow of dye additive is tampered with, power to the electronic control valve is terminated causing it to close and cut-off the flow of fuel in the main fuel delivery line.

3. A fuel delivery system for use in combination with a fuel delivery truck, said system having a dye additive injector for selectively adding a precise predetermined amount of dye into a main fuel delivery line so that the delivery system can selectively deliver either dyed or undyed fuel, comprising:

a dye additive storage tank, having an inlet and an outlet, adapted to received a dye additive;

a dye additive flow line for passage of said dye additive out of the storage tank and into the fuel delivery line;

a means for selectively initiating and terminating the flow of said dye additive out of the dye additive storage tank, through the dye additive flow line and into the main fuel delivery line;

an electronic control valve on the main fuel delivery line; and a tamper proof means, wherein if the power supply to the means for selectively initiating and terminating the flow of dye additive is tampered with, power to the electronic control valve is terminated causing it to close and cut-off the flow of fuel in the main fuel delivery line.

4. A fuel delivery system according to claim 1 wherein the dye flow line enters the fuel delivery line in the vicinity of the delivery nozzle of the fuel delivery line.

5. A fuel delivery system according to claim 4 further comprising a check valve on the dye flow line that closes when there is no pressure in the dye flow line to prevent addition of dye into the fuel delivery line and penetration of fuel into the dye flow line.

6. A fuel delivery system according to claim 5 further comprising a pressure relief valve to relieve pressure in the dye flow line.

7. A fuel delivery system according to claim 6 wherein the dye additive storage tank has a float sensor to interrupt flow in the fuel delivery line when the dye additive tank is empty.

8. A fuel delivery system according to claim 6 wherein the additive storage tank has a float sensor which when it registers that the tank is empty it signals an electronic shut-off valve preventing flow in the fuel delivery line.

9. A fuel delivery system according to claim 7 wherein the additive tank has a sight glass to visually observe the level of dye in the tank.

* * * * *

UNITED STATES PATENT AND TRADEMARK OFFICE
CERTIFICATE OF CORRECTION

PATENT NO. : 5,878,772
DATED : March 9, 1999
INVENTOR(S) : Stephen A. BELYEA

It is certified that error appears in the above-identified patent and that said Letters Patent is hereby corrected as shown below:

Column 5, Claim 1, Line 40, please replace "received" with --receive--

Column 6, Claim 3, Line 16, please replace "received" with --receive--

Signed and Sealed this

Eighteenth Day of April, 2000

Attest:

Q. TODD DICKINSON

Attesting Officer

Director of Patents and Trademarks